UNITED STATES PATENT OFFICE.

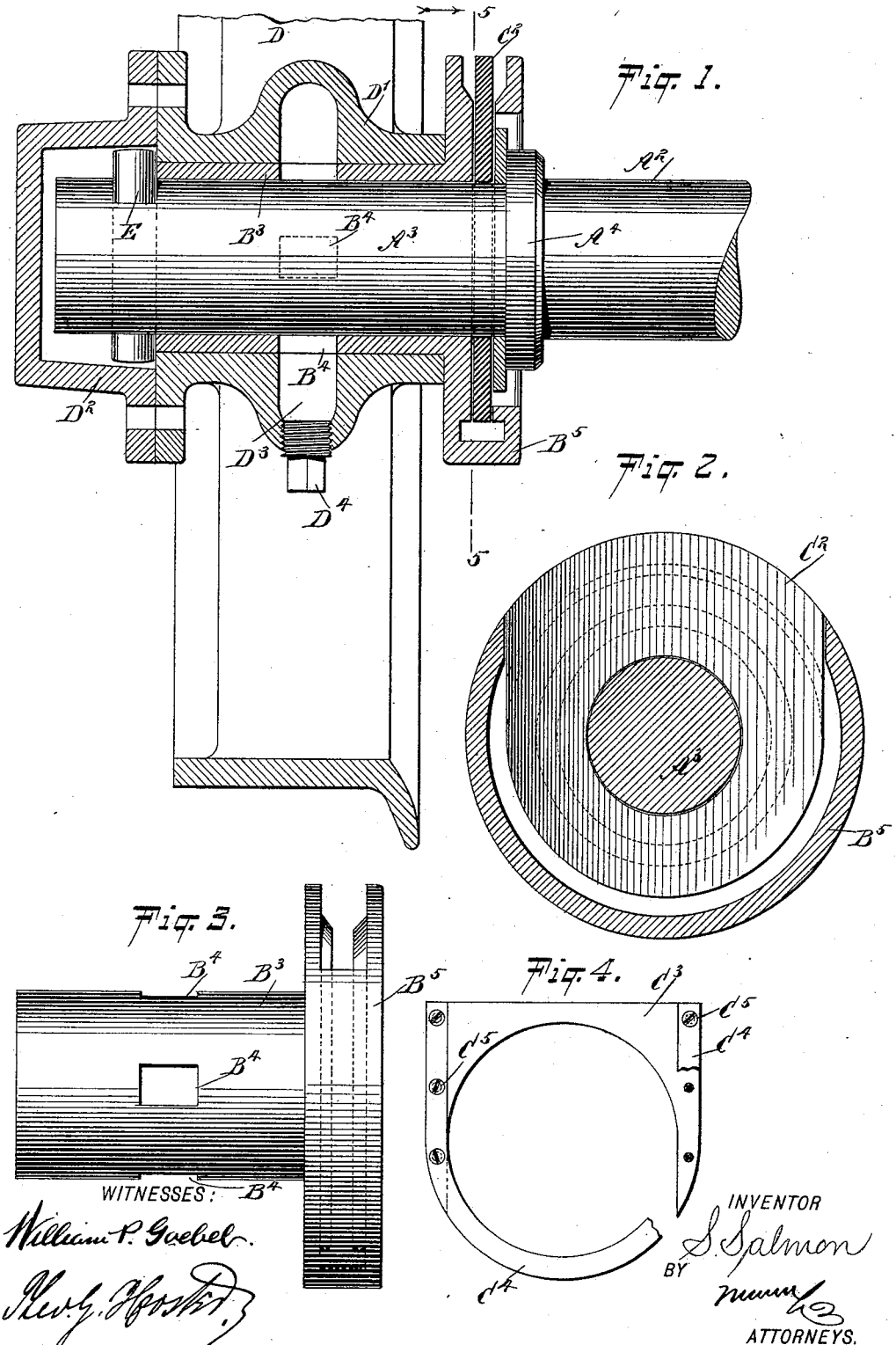

SAMUEL SALMON, OF DRIFTON, PENNSYLVANIA.

OIL-RETAINING BOX.

SPECIFICATION forming part of Letters Patent No. 607,279, dated July 12, 1898.

Application filed April 2, 1898. Serial No. 676,201. (No model.)

*To all whom it may concern:*

Be it known that I, SAMUEL SALMON, of Drifton, in the county of Luzerne and State of Pennsylvania, have invented a new and Improved Oil-Retaining Box, of which the following is a full, clear, and exact description.

The object of the invention is to provide a new and improved oil-retaining box arranged to keep the lubricant in good condition and always in position on the journal or bearing until it is completely used up, the arrangement preventing hot boxes, journals, and shafts and waste of lubricant.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

Figure 1 is a sectional side elevation of the improvement. Fig. 2 is a transverse section of the same on the line 5 5 of Fig. 1. Fig. 3 is a side elevation of the box shown in Fig. 1, and Fig. 4 is a face view of a modified form of closing-shield.

The device is applied to a mining-car wheel D, and the axle $A^2$ is fitted with its journal-bearing $A^3$ into a box in the form of a bushing $B^3$, fitted into the hub $D'$ of the said wheel D. A cap $D^2$ is secured to the hub $D'$ to close the outer end thereof, and on the inner end of said hub fits the enlarged end $B^5$ of the bushing, forming the guideway for the closing-shield $C^2$, fitted on the journal $A^3$ next to the shoulder $A^4$ on the axle $A^2$. The bushing $B^3$ is formed with openings $B^4$ at or near the middle thereof, said openings registering with an annular oil-chamber $D^3$, formed in the hub $D'$ and containing the lubricant, so that the latter readily passes through the openings $B^4$ to the journal $A^3$. The chamber $D^3$ is provided with a filling-opening normally closed by a screw-plug $D^4$. The bushing $B^3$ is driven into the hub $D'$ to prevent said bushing from rotating in the hub.

On the outer end of the journal $A^3$ is secured a linch-pin E, abutting against the end of the bushing $B^3$, so as to hold the bearing or journal $A^3$ in proper position in the bushing, it being understood that the collar or shoulder $A^4$ abuts against the outer face of the enlarged end $B^5$ of the bushing, as plainly indicated in Fig. 1.

Now it is evident that by the arrangement described the closing-shield, on account of being snugly fitted on the journal $A^3$, prevents a waste and escape of lubricant at the inner end of the said journal, so that the lubricant is retained on the journal, and consequently the latter is well lubricated.

The closing-shield may be made in two parts $C^3$ and $C^4$, as indicated in Fig. 4, of which the part $C^3$ is open at the bottom and the U-shaped ring $C^4$ is fastened at its sides by screws $C^5$ to the body $C^3$ to close the lower open end of the latter.

Having thus fully described my invention, I claim as new and desire to secure by Letters Patent—

1. The combination of a wheel having a hub provided with an annular oil-chamber, a cap secured to the outer end of the hub, a bushing provided with an enlarged inner end, the bushing being fitted within the hub and provided with openings registering with the oil-chamber therein, and the head of the bushing being located at and engaging with the inner end of the hub, the head of the bushing being provided with a guideway-opening at the top of the enlarged inner end of the bushing, a journal mounted in the bushing and extending into the cap, the journal being provided with a collar adjacent to the enlarged inner end of the bushing, and a closing-shield fitting loosely in the guideway of the enlarged inner end of the bushing and engaged by the collar.

2. The combination of a wheel having a hub, a bushing fitted within the hub and adapted to carry the journal on which the wheel is mounted, the inner end of the bushing having an enlargement located at and in engagement with the inner end of the hub, and the enlargement of the inner end of the bushing being provided with a guideway-opening at the top thereof, and a closing-shield fitted loosely within the guideway and adapted to be carried on the journal.

SAMUEL SALMON.

Witnesses:
FRANK E. MILLER,
ELLIOTT A. OBERRENDER.